March 16, 1971 J. A. CUPLER II 3,570,330
METHOD OF MACHINING INVOLVING PROGRESSIVE STEP TOOL CHANGE
Filed Dec. 23, 1968

INVENTOR
JOHN A. CUPLER, II

BY *Colton + Stone*

ATTORNEYS.

United States Patent Office 3,570,330
Patented Mar. 16, 1971

3,570,330
METHOD OF MACHINING INVOLVING PROGRESSIVE STEP TOOL CHANGE
John A. Cupler II, 10 Cupler Drive-La Vale,
Cumberland, Md. 21504
Filed Dec. 23, 1968, Ser. No. 786,344
Int. Cl. B23b 35/00
U.S. Cl. 77—5                                                                      6 Claims

ABSTRACT OF THE DISCLOSURE

The disclosure relates to a method of drilling wherein successively longer countersinking and counterboring tools are utilized to extend the length of a bore initially formed by a tool which is relatively short in comparison to the depth of drilling operation to be performed.

---

The machining concepts herein described may be most advantageously practiced with the automatic tool changer disclosed in copending application Ser. No. 715,711, filed Mar. 25, 1968, and of which this application is a continuation in part.

The invention relates to methods of conducting machining operations and, more particularly, to methods of drilling precision holes in workpieces that present angularly related work surfaces to be drilled. The invention finds its greatest application in the drilling of relatively small holes which, necessarily, require the use of small diameter drills in the range, for example, below .015″. Small diameter drills are, of course, relatively flexible as compared with larger diameter drills and are unable to withstand substantial lateral deflections without breaking. For a drill of given diameter, the deflectibility of the drill, and its concomitant likelihood of breakage, is directly related to its length. Consequently, the length to diameter ratio of a drill will determine the lateral forces which the drill can withstand without danger of breakage when drilling a material of known hardness with known infeed pressure applied to the drill. There are many space age alloys which are exceedingly difficult to machine and their great hardness and/or toughness is another complicating factor as will be readily understood from the foregoing discussion. One of the alloys which is exceedingly difficult to machine is known as Waspaloy and has the following weight percentage composition: C, .07; Si, .10; Mn, .10; Cr, 19.75; Co, 13.5; Mo, 4.45; Ti, 3.0; Al, 1.4; Fe, .75; B, .005; Zn, .04; Ni, balance.

When it is required to drill a workpiece whose surface is angularly related to the axis of drill infeed, as in the machining of air cooling holes in hollow gas turbine blades and vanes having compound surfaces of curvature, for example; substantial lateral forces are imposed on the drill when the drill first engages the workpiece and before substantial penetration has been achieved. Stated differently, the drill tends to "walk" in the direction in which the work surface is inclined. It is during this initial penetration period that drill breakage most frequently occurs and is due, primarily, to the lateral forces developed in the drill. Other factors contributing to tool fatigue and breakage, particularly in very small tools, are excessive torsional stresses and the development of excessive frictional heat. Once the angularly related surface of the workpiece has been penetrated, the problem of lateral deflection is decreased since the surrounding bore wall acts to captivate the tool and the drill proceeds much in the same manner as in a perpendicularly related work surface.

Although the lateral forces diminish following penetration the other factors discussed above, i.e. torsional stresses and the development of frictional heat, increase as the drilling operation continues. Higher temperatures and torsional stresses develop as the bore is lengthened due to increased frictional contact wtih the bore walls and the increasing path of travel required for metal chip removal. Additionally, the torsional stresses developed will depend upon the type drill point used; the torsional stresses being greater in drills whose end points have substantial tapers than in those having blunt or flat ends. Since the tapered end drill is a better metal removal tool, the selection of the appropriate tool, in conventional drilling operations, is a compromise based on metal removal capabilities vis-a-vis the likelihood of drill breakage. As in the case of lateral deflections, the likelihood of tool breakage due to excessive torsional stresses increases with the length to diameter ratio of the tool.

All of the foregoing difficulties are compounded when the workpiece is one which can be machined only with great difficulty under the most favorable conditions, such as Waspaloy.

Accordingly, it is a primary object of the invention to teach a method of drilling a workpiece presenting an angularly related work surface and in which the lateral and torsional stresses developed in the drills are substantially reduced and overheating is avoided without sacrificing speed in drilling. It is among the further objects of the invention to, in effect, perform nothing but surface drilling throughout the entire drilling operation and to extend the life of the drilling tools.

The foregoing and other objectives are achieved by utilizing a plurality of different tools, each having different physical characteristics, in the formation of a single bore hole.

Conventional drilling methods require the selection of a single compromise tool to perform a particular drilling operation, as previously explained. In accordance with the method herein disclosed wherein a plurality of drills are used to form a single hole, the most advantageous characteristics of various type drills may be utilized to various stages of the drilling operation. Thus, where lateral deflections are the most critical, as during initial penetration of the work surface, a very short drill having a low length to diameter ratio and a flat bottom may be used and subsequently interchanged with a tool having better metal removal characteristics once the bore has been started so that the new tool will be captivated by the bore wall. Additionally, by utilizing successive pairs of drilling tools whose lengths exceed the previous pair of working tools by a very small amount, such as by a length equal to the drill diameter, each drill has the smallest possible length to diameter ratio which is very important in reducing lateral and torsional stresses. It is only the last drill pair which will have a length to diameter ratio equal to that which is normally required to perform the entire drilling operation and that particular drill pair is only required to drill through a distance equal to the diameter of the drill. Considering for a moment these last drills whose L/D ratio is equal to that conventionally used; it will be appreciated that before these drills are used, a relatively long bore has already been formed which acts to captivate the drills so that the tendency for lateral deflection is negligible as compared with that involved were such a long $L/D$ ratio drill used to initially penetrate the inclined work surface. Additionally, the frictional heat developed is far less because of the much shorter drilling time of each tool and tool fatigue is substantially reduced thus extending tool life.

Another very important facet of the invention resides in the fact that each successive tool used in forming the bore has a tool end which is different from that of the immediately preceding tool. In a preferred form of the invention, every alternate tool is a flat bottom tool and the remaining tools have tapered ends. Thus, a first flat bottom tool initiates the bore hole and is removed to be replaced by a second tapered end drill. Such tapered end drills normally have a taper which is equal to the drill diameter. From the standpoint of the tapered end drill, the flat bottom bore presents a flat surface perpendicular to the direction of drill infeed and if the second tapered tool is only fed inwardly a small distance, such as a length of one drill diameter, the second drill does nothing more than form a countersink in a perpendicular surface. Having thus performed what is, in effect, a surface drilling operation, the second tapered drill is withdrawn to be replaced by a third tool having an $L/D$ ratio equal to the second tapered tool, which is flat bottomed. This flat bottom tool "sees" a tapered end bore and merely performs a counterboring operation through a minimal infeed distance until the bore is again a flat bottom one at which time the third tool is withdrawn and a fourth tool, having a tapered end and a length exceeding the previous tool by one tool diameter, is inserted in the bore to perform yet another "surface drilling" operation.

Because each tool pair is only slightly longer than the preceding tool pair the $L/D$ ratio of the working tool, at any given time, has a minimal value consistent with its position in the tool change cycle and will be, in all cases except for the last pair of working tools, less than the $L/D$ ratio of the single tool conventionally used to perform such a drilling operation.

As indicated above, it has been found to be particularly advantageous to interchange drills after each linear infeed equal to approximately one drill diameter since this enhances the concept of continual surface drilling. It is, of course, apparent that the method according to the invention must include means for providing a virtually instantaneous tool interchange while insuring that each successive tool is coaxially aligned with the previous tool centerline. The manner in which these latter two functions are achieved is fully set out in the aforesaid copending application Ser. No. 715,711.

The manner in which the foregoing and other objectives are achieved will become more apparent from the ensuing description when considered in conjunction with the attached drawings wherein.

Figure 1:
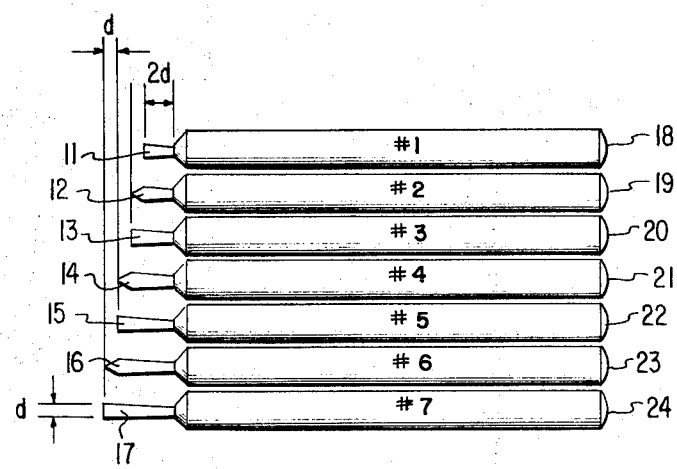
FIG. 1 is a plan view of a plurality of tools which are to be used in the drilling of a single hole.
Figure 2:
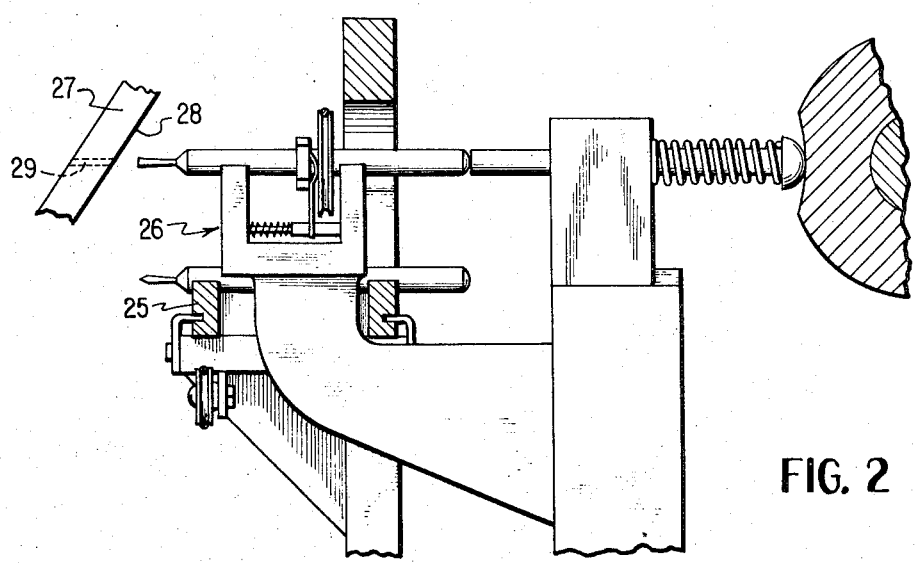
FIG. 2 is an elevational view, with parts broken away, of a workpiece having a work surface angularly inclined relative to the axis of the working tools and a fragmentary showing of a portion of an automatic tool changer.

A plurality of tools, designated #1–#7, are depicted in FIG. 1 having drill blades 11–17 formed integrally with similar spindles 18–24. Except for the first drill blade, successive blade pairs are of different axial lengths, and all are formed to drill a constant diameter bore. In a preferred form of the invention, tool #1 is provided with a flat bottom drill blade 11 herein illustrated as a side cutting end mill whose length to diameter ratio is 2:1. Tool #2 is formed with a tapered end drill whose length to diameter ratio is 3:1. Tool #3 is formed with a side cutting end mill whose $L/D$ ratio is, similarly, 3:1. Each succeeding tool pair #4–#7, is provided with drill blades which are one diameter longer than the preceding pair of blades and the blade of each odd numbered tool is flat bottomed while the even numbered tool blades are formed with tapered ends.

Tools #1–#7 are adapted to be supported on a tool rack 25 for sequential placement in V bearing 26 whereupon the bearing supported tool is rotated and infed into workpiece 27, such as a turbine blade, having an angularly related work surface 28. The manner in which the tools are sequentially interchanged with the V bearing, rotated and infed into the workpiece is described in the aforesaid copending application Ser. No. 715,711.

Figure 3:
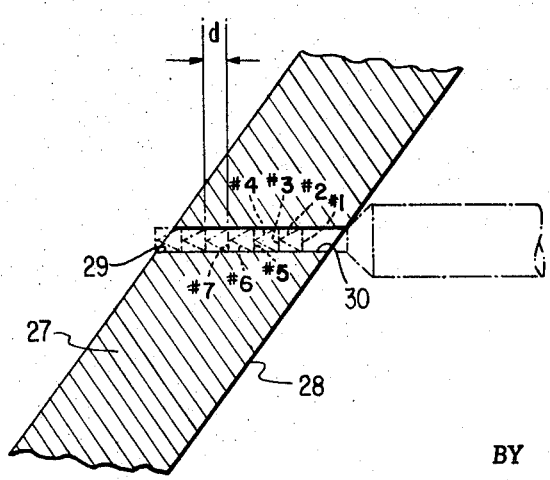
FIG. 3 is a greatly enlarged detailed view of the workpiece.

In the formation of holes 29 in workpiece 27, tool #1, having the short stubby blade 11, makes the initial penetration to form the flat bottom blind bore indicated at the dotted line position designated #1 in FIG. 3. Because of the very short length of blade 11, it is far more resistant to lateral deflections and excessive torsional stresses than would be the case with a blade sufficiently long to drill completely through the workpiece. A flat bottom tool is used for the initial penetration because it has a far less tendency to "walk" down the inclined work surface than does a tapered end tool thus further reducing the lateral stresses imposed during the initial surface penetration as compared with conventional drilling methods. Once the initial blind bore is formed by tool #1 to a depth equal to substantially twice the drill diameter, tool #2 is interchanged with tool #1 in the manner explained in the aforesaid copending application and the drilling is continued with the tapered drill 12. It will be noted that, so far as the drill 12 is concerned, it is working on a flat perpendicular surface and its penetration is preferably equal to the length of the tapered point indicated by the dotted line position denoted #2 in FIG. 3 which may advantageously be one drill diameter in length. The bore wall 30 formed by tool #1 acts to captivate blade 12 and reduce lateral stresses. Since blade 12 only penetrates the length of its tapered end, the operation is analogous to merely forming a countersink in a perpendicularly related work surface and the relatively short time interval during which this tool is working precludes substantial torsional stress and temperature accumulations which contributes greatly to the longevity of the tools. Following the machining operation conducted by tool #2, flat bottom tool #3 is introduced into the bore which now has a countersunk end, and performs a counterboring operation to again produce a flat bottom bore indicated by phantom line #3 in FIG. 3. The foregoing cycle of operation is then repeated with as many tools as necessary to complete hole 29.

Although the sequential use of tool pairs having blades whose length exceeds each preceding blade pair by one diameter, which is also equal to the length of the tapered end of the countersink drills, enhances the concept of continuous "surface drilling"; these relative dimensions are not critical to the attainment of other advantages such as the concept of increasing drill life by reducing the temperatures and mechanical stresses to which the blades are subjected.

The exemplary dimensional relationships indicated in the drawing are to facilitate an understanding of the preceding description and it is to be understood that the same principles are applicable in the case of much smaller tools as well as much larger ones.

I claim:

1. A method of machining a hole, comprising; drilling a blind flat bottom bore in a workpiece; and extending the depth thereof by performing sequential countersinking and counterboring operations in said bore.

2. The method of claim 1 wherein the depth of said bore is extended by a plurality of countersinking operations alternating with a plurality of counterboring operations.

3. The method of claim 1 wherein said sequential operations include the steps of introducing successively longer drilling blades into said bore.

4. The method of claim 2 wherein each of said operations extends the bore depth by substantially less than three times the diameter thereof.

5. A method of utilizing a plurality of tools to form a hole in a workpiece presenting an angularly inclined work surface to the initial axis of rotation of said tools, comprising; penetrating the inclined surface with a flat bottom tool and forming a blind flat bottom bore having a bore wall parallel to said initial axis of rotation of said tools; and, sequentially, countersinking and counterboring said hole to a desired depth.

6. The method of claim 4 wherein each of said operations extends the bore depth by substantially one diameter thereof.

References Cited
UNITED STATES PATENTS

| | | | |
|---|---|---|---|
| 3,064,501 | 11/1962 | Brown | 77—32.3 |
| 2,924,130 | 2/1960 | Reynolds | 77—65 |
| 2,645,952 | 7/1953 | Bunnell | 77—32.3 |
| 1,177,983 | 4/1916 | Avis | 77—5UX |

FRANCIS S. HUSAR, Primary Examiner

U.S. Cl. X.R.

29—558; 77—32.3